(12) United States Patent
Yamaguchi et al.

(10) Patent No.: US 8,545,988 B2
(45) Date of Patent: Oct. 1, 2013

(54) POLYETHERIMIDE AND POLYETHERIMIDE SULFONE BLENDS HAVING AUTOMOTIVE LIGHTING APPLICATIONS

(75) Inventors: Norimitsu Yamaguchi, Newburgh, IN (US); Roy Ray Odle, Mount Vernon, IN (US); Sanjay Mishra, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 71 days.

(21) Appl. No.: 12/347,542

(22) Filed: Dec. 31, 2008

(65) Prior Publication Data
US 2009/0258991 A1 Oct. 15, 2009

Related U.S. Application Data

(60) Provisional application No. 61/031,031, filed on Feb. 25, 2008.

(51) Int. Cl.
*C08G 73/10* (2006.01)
*C08L 79/08* (2006.01)

(52) U.S. Cl.
USPC ........ 428/458; 428/437; 428/473.5; 525/420; 525/432; 525/436

(58) Field of Classification Search
USPC .............. 428/457, 458, 473.5; 525/420, 432, 525/436
See application file for complete search history.

(56) References Cited

U.S. PATENT DOCUMENTS

| | | | |
|---|---|---|---|
| 7,041,773 B2 * | 5/2006 | Gallucci et al. | 528/170 |
| 2005/0288406 A1 * | 12/2005 | Gallucci et al. | 524/115 |
| 2007/0060688 A1 | 3/2007 | Wang et al. | |
| 2008/0119610 A1 | 5/2008 | Gallucci et al. | |
| 2008/0119616 A1 | 5/2008 | Donovan et al. | |
| 2009/0099299 A1 | 4/2009 | Gallucci et al. | |
| 2009/0099300 A1 | 4/2009 | Gallucci et al. | |

FOREIGN PATENT DOCUMENTS
WO 2006091481 A 8/2006

OTHER PUBLICATIONS
International Search Report for International Application No. PCT/US2009/033867, mailed Aug. 3, 2009, 4 pages.
Written Opinion for International Application No. PCT/US2009/033867, mailed Aug. 3, 2009, 6 pages.

* cited by examiner

*Primary Examiner* — Ana Woodward
(74) *Attorney, Agent, or Firm* — Cantor Colburn LLP; Diderico van Eyl

(57) ABSTRACT

Compositions and articles of manufacture made therefrom for use in high temperature application, such as automotive reflectors, have a minimum haze onset temperature of about 205° C. and are made from a transparent, miscible blend of from about 30 to about 70 weight percent of a polyetherimide sulfone comprising greater than or equal to 50 mole percent of the polymer linkages have an aryl sulfone group and from about 70 to about 30 weight percent of a polyetherimide or polyimide.

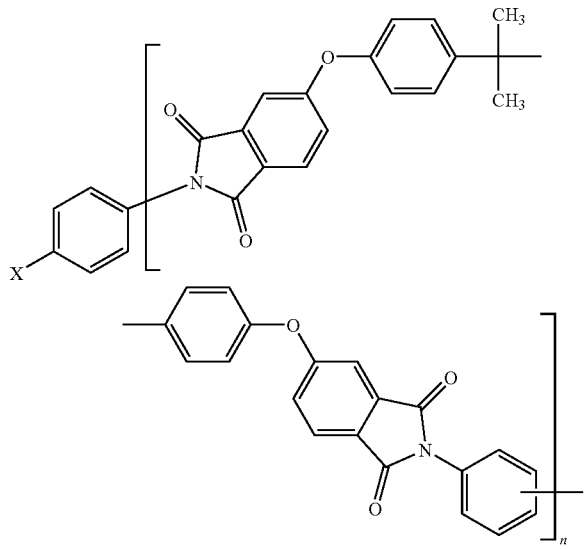

15 Claims, 1 Drawing Sheet

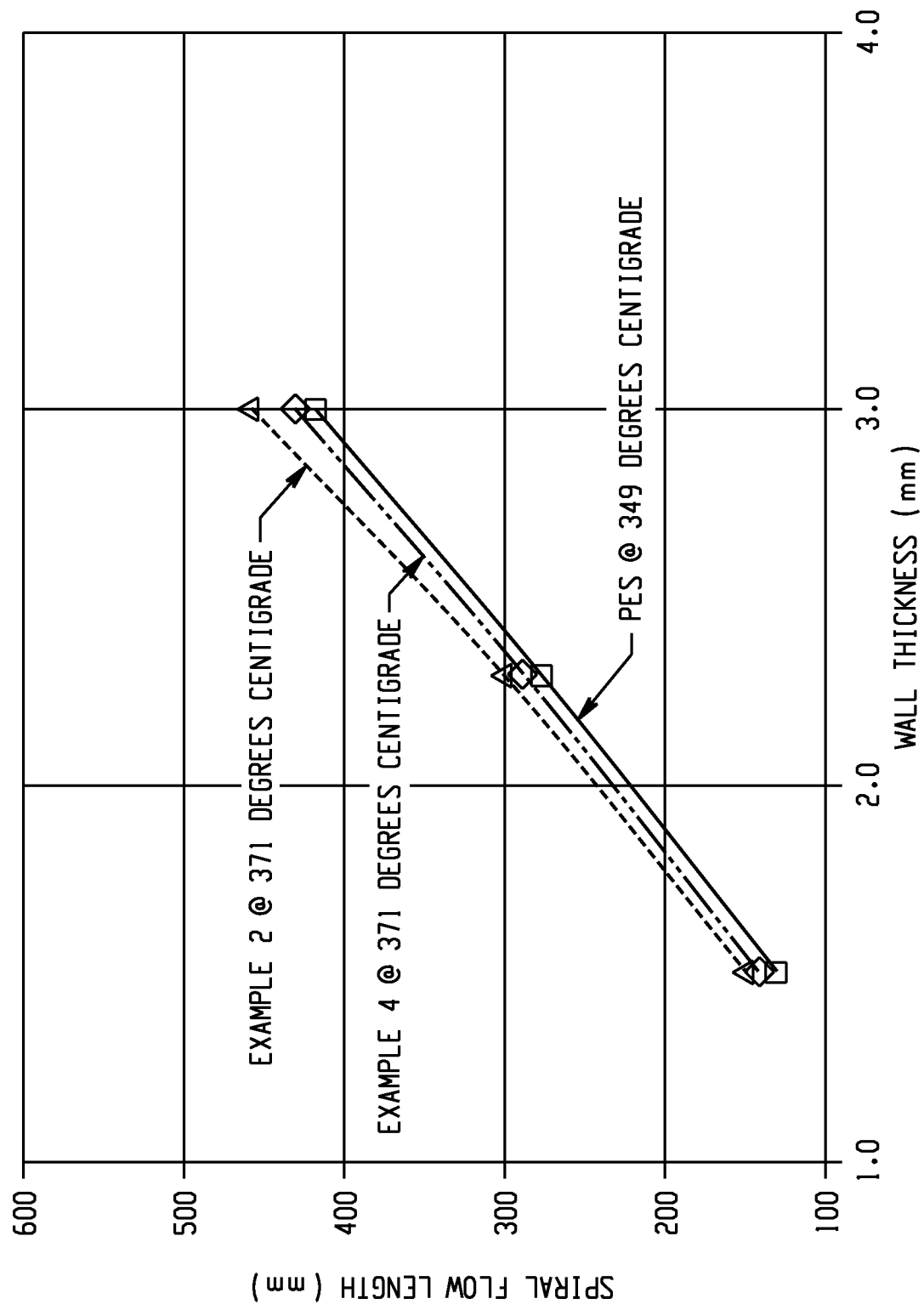

POLYETHERIMIDE AND POLYETHERIMIDE SULFONE BLENDS HAVING AUTOMOTIVE LIGHTING APPLICATIONS

RELATED APPLICATIONS

The present application claims priority to U.S. Provisional Application No. 61/031,031 filed Feb. 20, 2008 titled "Polyetherimide and Polyetherimide Sulfone Blends having Automotive Lighting Applications".

FIELD OF INVENTION

The present invention relates generally to the field of articles of manufacture in the form of a shaped article comprising a blend of polymers with higher heat capabilities making such useful in automotive lighting applications.

BACKGROUND OF THE INVENTION

Polymers having good manufacturing and performance properties at elevated temperatures are continually in great demand. For example, high heat polymers are useful for replacing metal parts in "under the hood" automotive applications. High heat polymers are capable of withstanding heat on a comparable level as metal parts, but weigh less and so contribute to more fuel efficient automobiles. Other automotive uses further demonstrate a continuing need for high heat polymers.

Lighting reflectors, especially for automotive applications, require materials that can withstand the high heat produced by light sources, that have excellent dimensional stability to focus the light in a tight pattern at long distances, and that can be easily processed into complex shapes. These reflectors are usually coated with a metal, such as aluminum, to provide a highly reflective surface. To achieve this high degree of reflectivity with low haze, a very smooth pre-coated surface is required. In order to consistently achieve such a smooth pre-coated surface, it has typically been necessary to base coat the molded reflector with a primer prior to coating the reflector with metal. Direct metalization of molded parts is also challenging because it introduces the additional requirements of good adhesion of the metal to the molded part and a very smooth surface of the part as molded.

In electronic components there has been a move to leadless solder at least partially because of the deleterious effects caused by lead on the environment. Replacement solders have higher melting points than lead based solders. Thus, polymers capable of withstanding the additional heat necessary to melt the lead replacement solders are needed for use as, for example, substrates or coatings in close proximity to soldering points. Even uses such as polymer parts feeling the heat from jet engine wash, lead to a continuing demand for polymers having higher heat properties than those currently on the market.

Several classes of high heat polymers are known in the art. Polyetherimide resins are known for high heat capabilities with good processability that make their use as coatings, molded articles, composites, and the like very attractive where high temperature resistance is desired.

Polyetherimide resins may be blended with high heat polyetherimide sulfone resins with glass transition temperature above 230° C. to improve thermal performance such as heat deflection temperature and haze onset temperature for surface metalized articles while maintaining good processability. Due to insufficient flow in certain high heat polyetherimide sulfone resins, however, a good balance of thermal properties and flow is required for overall performance of the blends Thus, there remains a continuing need for polymer compositions having high heat capabilities in combination with those necessary additional properties that allow for good processability in critical application. It is to the provision of such that the present invention is primarily directed.

SUMMARY OF THE INVENTION

The present invention is directed to a composition and articles of manufacture made therefrom comprising a transparent, miscible blend of from about 30 to about 70 weight percent of a polyetherimide sulfone comprising greater than or equal to 50 mole percent of the polymer linkages have an aryl sulfone group (hereinafter, alternatively, referred to as "PEIS") and from about 70 to about 30 weight percent of a polyetherimide (hereinafter, alternatively, referred to as "PEI") and wherein the composition has a minimum haze onset temperature of about 205° C. The polyetherimide comprises more than 1 structural units of the Formula I:

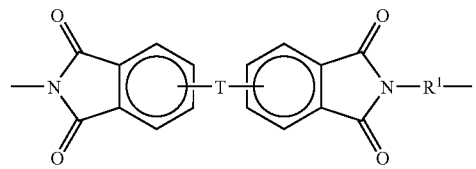

wherein T is —O— or a group of the formula —O—Z—O—, wherein Z is a substituted or unsubstituted divalent organic radical selected from the group consisting of: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, (d) diphenyl group, or (e) divalent radicals of the general Formula II:

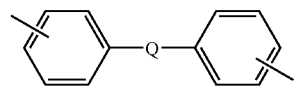

wherein Q is a divalent group selected from the group consisting of —O—, —C(O)—, —SO$_2$—, —C$_y$H$_{2y}$- (y being an integer from 1 to 8), and fluorinated derivatives thereof, including perfluoroalkylene groups;

and wherein R$^I$ is selected from the group consisting of (a) aromatic hydrocarbon radicals having about 6 to about 24 carbon atoms and halogenated derivatives thereof; (b) straight or branched chain alkylene radicals having about 2 to about 20 carbon atoms; or (c) cycloalkylene radicals having about 3 to about 20 carbon atoms.

In another embodiment, the present invention is directed to a composition and articles of manufacture made therefrom comprising a transparent, miscible blend of from about 30 to about 70 weight percent of a polyetherimide sulfone made from reaction of bisphenol-A dianhydride with about an equal molar amount of 4,4'-diamino diphenyl sulfone and from about 70 to about 30 weight percent of a polyimide comprising structural units of the Formula III:

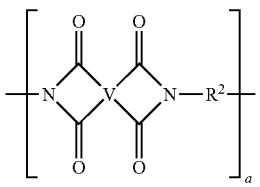

wherein "a" has a value of greater than 1, V is a tetravalent linker, and $R^2$ is a substituted or unsubstituted divalent organic radical; wherein the polyimide is made by reacting an organic diamine monomer having a molecular weight from 100 to 500 with an aromatic dianhydride monomer with a molecular weight from 218 to 1000 and the molecular weight of the polyimide is controlled by addition of an aromatic monoamine capping agent of molecular weight 93 to 250; and wherein said polyimide comprises less than 5 weight percent of impurities based on the weight of the polyimide, said impurities having a molecular weight of less than about 500 daltons and comprising structural units derived from at least one monomer unit or from at least one aromatic monoamine; and wherein the composition has a minimum haze onset temperature of about 205° C.

The present invention provides previously unavailable advantages. The compositions have higher haze onset temperatures with superior strength and stiffness while showing significantly lower specific gravity and water absorption compared to polyether sulfone (hereinafter, alternatively, referred to as "PES") and the prior art blends of PEIS and PEI. In addition, the blends exhibit lower plate-out properties and have excellent metal adhesion properties under extremely severe environmental conditions. These properties make the composition suitable for many applications, including but not limited to automotive lighting. The composition may be made into various articles of manufacture.

DESCRIPTION OF THE FIGURES

FIG. 1 is a spiral flow plots chart that supports the high shear rheology results by showing that a ~20° C. increase in processing temperature is sufficient in order to obtain equivalent or longer spiral flow lengths at all wall-thicknesses for Examples 2 and 4 with respect to poly(ether sulfone).

DETAILED DESCRIPTION OF THE INVENTION

Definitions

The term "article of manufacture" is used consistent with this terms use by the United States Patent and Trademark Office and according to the present invention is any industrially produced polymeric material which is a blend of polymers, including at least one polyetherimide sulfone and at least one polyetherimide or polyimide.

The term "composition" refers to the molecular makeup of a material, whereby materials having different molecular composition or structure are different compositions.

The term "polymer linkage" or "a polymer linkage" is defined as the reaction product of at least two monomers that form the polymer.

The term "metallized surface" refers to a surface that is covered with a coating comprising one or more metals.

The term "reflector" refers to a light modifying device having a surface which redirects incident light back into the medium from which it came. Reflectors are more commonly opaque but may be transparent. Light incident on the redirecting surface of a transparent reflector may arrive from the transparent material of the reflector itself in which case it is redirected back into the transparent material of the reflector, or it may arrive at the redirecting surface from some other material (e.g., air) in which case it is redirected back into the other material.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

Disclosed herein are compositions and articles of manufacture that comprise transparent, miscible polymer blends of from about 30 to about 70 weight percent polyetherimide sulfone and of from about 70 to about 30 weight percent polyetherimide or polyimide and that exhibit higher haze onset temperatures of a minimum of 205° C. while maintaining other critical properties and not sacrificing processability and thus are suitable for automotive applications.

The polyetherimide sulfone component comprises greater than or equal to about 50 mole percent of the polymer linkages having an aryl sulfone group. As used herein the term "polymer linkage" or "a polymer linkage" is defined as the reaction product of at least two monomers which form the polymer, wherein at least one of the monomers is a dianhydride, or chemical equivalent, and wherein the second monomer is at least one diamine, or chemical equivalent. The polymer is comprised of 100 mole percent of such linkages. A polymer which has 50 mole percent aryl sulfone linkages, for example, will have half of its linkages (on a molar basis) comprising dianhydride or diamine derived linkages with at least one aryl sulfone group. In one embodiment, the polyetherimide sulfone is preferably made by reacting a salt of a dihydroxy-substituted aromatic hydrocarbon of the formula HO-A-OH in the presence of a catalyst with a substituted aromatic bis(etherimide) compound of the Formula IV:

IV

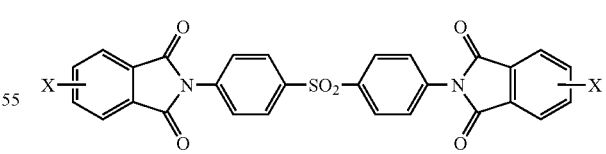

wherein A is divalent aromatic radical and X is halogen or nitro group. Preferably, the salt of the dihydroxy-substituted aromatic hydrocarbon is 4,4'-dihydroxy-2,2-diphenylpropane (Bisphenol A). The catalyst is preferably a quanidinium salt.

The polyetherimide component of the composition comprises more than 1, typically about 10 to about 1000 or more specifically about 10 to about 500 structural units, of the Formula I:

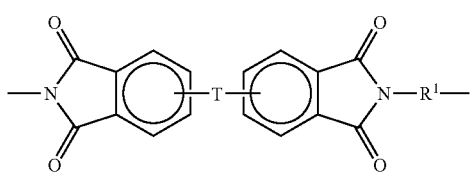

wherein T is —O— or a group of the formula —O—Z—O—, wherein Z is a substituted or unsubstituted divalent organic radical selected from the group consisting of: (a) aromatic hydrocarbon radicals having about 6 to about 20 carbon atoms and halogenated derivatives thereof; (b) straight or branched chain alkylene radicals having about 2 to about 20 carbon atoms; (e) cycloalkylene radicals having about 3 to about 20 carbon atoms, (d) diphenyl group, or (e) divalent radicals of the general Formula II:

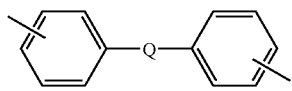

wherein Q is a divalent group selected from the group consisting of —O—, —C(O)—, —SO$_2$—, —C$_y$H$_{2y}$- (y being an integer from 1 to 8), and fluorinated derivatives thereof, including perfluoroalkylene groups;
and
wherein in R$^1$ is selected from the group consisting of (a) aromatic hydrocarbon radicals having about 6 to about 24 carbon atoms and halogenated derivatives thereof; (b) straight or branched chain alkylene radicals having about 2 to about 20 carbon atoms; or (c) cycloalkylene radicals having about 3 to about 20 carbon atoms.

Preferably, in Formula I, the divalent bonds of the -T-, or the —O—Z—O-group or -Q- are in the 3,3', 3,4', 4,3', or 4,4' positions, and mixtures thereof. Also, preferably, the polyetherimide comprises structural units according to Formula I wherein each R$^1$ is independently p-phenylene or m-phenylene or a mixture thereof and T is a divalent radical of the Formula IV:

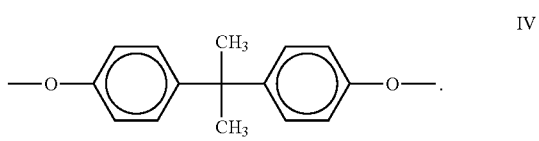

In another preferred embodiment the polyetherimide comprises structural units of the Formula V:

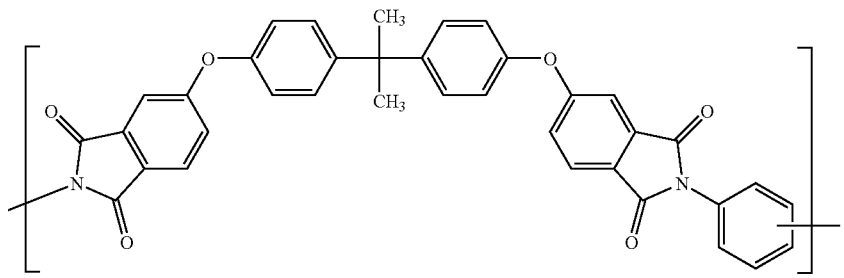

In another embodiment, the polyetherimide comprises structural units of the Formula VI

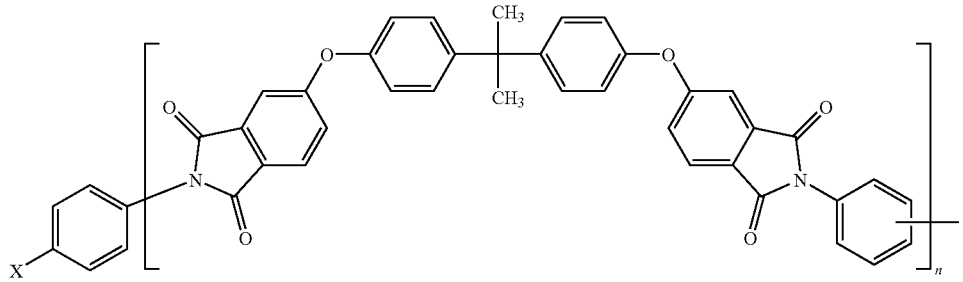

wherein X is hydrogen, a halogen, a nitro group or an alkyl substituent.

When x is hydrogen, the polyetherimide of Formula VI, becomes a polyetherimide of Formula VII

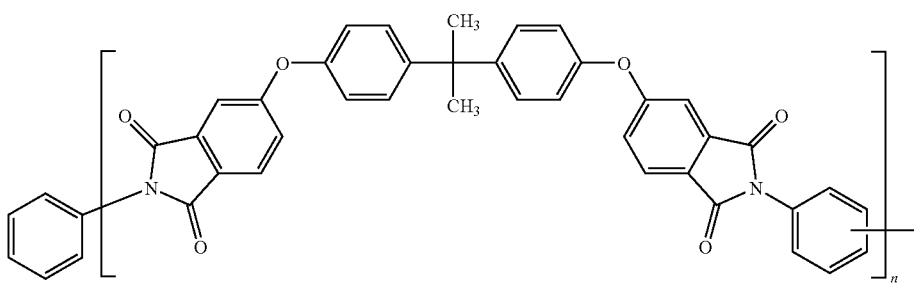

The polyetherimide preferably comprises less than 5 weight percent of impurities based on the weight of the polyetherimide, said impurities having a molecular weight of less than about 500 daltons and comprising structural units derived from at least one monomer unit or from at least one aromatic monoamine.

In another embodiment of the invention, the composition has a minimum haze onset temperature of about 205° C. and comprises a transparent, miscible blend of (a) from about 30 to about 70 weight percent of a polyetherimide sulfone made from the reaction of bisphenol-A dianhydride with about an equal molar amount of 4,4'-diamino phenyl sulfone and (b) from about 70 to about 30 weight percent of a polyimide comprising structural units of the Formula VI:

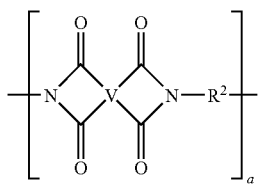

wherein "a" has a value greater than 1, typically about 10 to about 1000 or more, or, more specifically about 10 to about 500; wherein V is a tetravalent linker without limitation, as long as the linker does not impede synthesis or use of the polyimide; wherein $R^2$ is a substituted or unsubstituted divalent organic radical; wherein the polyimide is made by reacting an organic diamine monomer having a molecular weight from 100 to 500 with an aromatic dianhydride monomer with a molecular weight from 218 to 1000 and the molecular weight of the polyimide is controlled by addition of an aromatic monoamine capping agent of molecular weight 93 to 250; and wherein said polyimide comprises less than 5 weight percent of impurities based on the weight of the polyimide, said impurities having a molecular weight of less than about 500 daltons and comprising structural units derived from at least one monomer unit or form at least one aromatic monoamine. Suitable tetravalent linkers include but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Preferred linkers include but are not limited to tetravalent aromatic radicals, such as those having the following formulas:

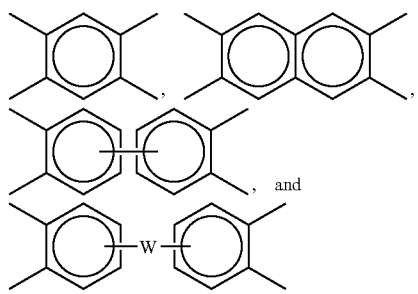

wherein W is a divalent group selected from the group consisting of —O—, —S—, —C(O)—, SO2-, —SO—, —CyH2y- (y being an integer having a value of 1 to about 8), and fluorinated derivatives thereof, including perfluoroalkylene groups, or a group of the formula —O—Z—O— wherein the divalent bonds of the —W— or the —O—Z—O— group are in the 3,3', 3,4', 4,3', or the 4,4' positions, and wherein Z is defined as above.

Preferably, the polyimide has greater than or equal to about 50 mole percent of the polymer linkages having an ether linkage of —O— or —O—Z—O—, wherein Z is a substituted or unsubstituted divalent organic radical selected from the group consisting of: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 24 carbon atoms, or (d) divalent radicals of the general Formula II:

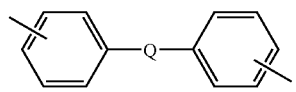

wherein Q is defined as above.

Polyetherimides sulfones and polyetherimide or polyimides ("polymer components") may have a melt index of about 0.1 to about 10 grams per minute (g/min), as measured by American Society for Testing Materials (ASTM) D1238 at 340-370° C., using a 6.6 kilogram (kg) weight. In a one embodiment, such polymers have a weight average molecular weight (Mw) of about 10,000 to about 150,000 grams per mole (g/mole), as measured by gel permeation chromatography, using a polystyrene standard. In another embodiment such polymers have Mw of 20,000 to 60,000. Such polymers typically have an intrinsic viscosity greater than about 0.2 deciliters per gram (dl/g), or, more specifically, about 0.35 to about 0.7 dl/g as measured in m-cresol at 25° C.

The polyetherimide polymer can be prepared by any of the methods well known to those skilled in the art, including the reaction of an aromatic bis(ether anhydride) of the Formula VII:

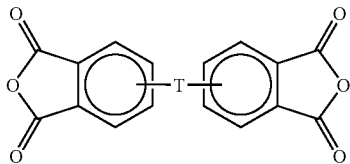

wherein T is —O— or a group of the formula —O—Z—O— wherein the divalent bonds of the —O— or the —O—Z—O— group are in the 3,3', 3,4', 4,3', or the 4,4' positions, and wherein Z includes, but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general Formula II:

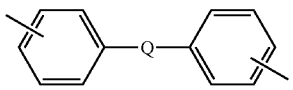

wherein Q includes but is not limited to a divalent group selected from the group consisting of —O—, —C(O)—, —SO$_2$—, —C$_y$H$_{2y}$— (y being an integer from 1 to 8), and fluorinated derivatives thereof, including perfluoroalkylene groups, with an organic diamine of the Formula VIII:

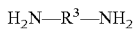

wherein group R$^3$ in Formula VIII includes, but is not limited to, substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general Formula II above.

Examples of specific aromatic bis anhydrides and organic diamines are disclosed, for example, in U.S. Pat. Nos. 3,972, 902 and 4,455,410. Illustrative examples of aromatic bis anhydride include: 3,3-bis[4-(3,4-dicarboxyphenoxy)phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 2,2-bis[4-(2, 3-dicarboxyphenoxy)phenyl]propane dianhydride; 4,4'-bis (2,3-dicarboxyphenoxy)diphenyl ether dianhydride; 4,4'-bis (2,3-dicarboxyphenoxy)diphenyl sulfide dianhydride; 4,4'-bis(2,3-dicarboxyphenoxy)benzophenone dianhydride; 4-(2, 3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; and, 4-(2,3-dicarboxyphenoxy)-4'-(3,4-dicarboxyphenoxy)benzophenone dianhydride; as well as mixtures thereof.

Examples of suitable diamines include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamide, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3' dimethoxybenzidine, 1,5-diaminonaphthalene, bis(4-aminophenyl)methane, bis (2-chloro-4-amino-3,5-diethylphenyl)methane, bis(4-aminophenyl) propane, 2,4-bis(amino-t-butyl) toluene, bis(p-amino-t-butylphenyl)ether, bis(p-methyl-o-aminophenyl) benzene, bis(p-methyl-o-aminopentyl)benzene, 1,3-diamino-4-isopropylbenzene, bis(4-aminophenyl) sulfide, bis(4-aminophenyl) sulfone, bis(4-aminophenyl)ether and combinations comprising two or more of the foregoing. In one embodiment the diamino compounds are aromatic diamines, especially m- and p-phenylenediamine, sulfonyl dianiline and mixtures thereof.

Included among the many methods of making polyetherimides are those disclosed in U.S. Pat. Nos. 3,847,867, 3,852, 242, 3,803,085, 3,905,942, 3,983,093, and 4,443,591. These patents mentioned for the purpose of teaching, by way of illustration, general and specific methods for preparing polyetherimides.

The polyetherimide sulfones described herein can be derived from reactants comprising one or more aromatic diamines or their chemically equivalent derivatives and one or more aromatic tetracarboxylic acid cyclic dianhydrides (sometimes referred to as aromatic dianhydrides), aromatic tetracarboxylic acids, or their derivatives capable of forming cyclic anhydrides. In addition, at least a portion of one or the other of, or at least a portion of each of, the reactants comprise aromatic diamines and aromatic dianhydrides comprises an aryl sulfone linkage such that at least 50 mole percent of the resultant polymer linkages contain at least one aryl sulfone group. In a particular embodiment all of one or the other of, or, each of, the reactants comprising aromatic diamines and aromatic dianhydrides having at least one sulfone linkage. The reactants polymerize to form polymers comprising cyclic imide linkages and sulfone linkages.

In a particular embodiment the dihydroxy-substituted aromatic hydrocarbon comprising bisphenols with sulfone linkages are of note as this is another route to introducing aryl sulfone linkages into the polyetherimide sulfone resin. In other instances bisphenol compounds free of benzylic protons may be preferred to make polyetherimide sulfones with superior melt stability.

Illustrative examples of aromatic dianhydrides containing sulfone linkages include: 4,4'-bis(3,4-dicarboxyphenoxy) diphenyl sulfone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl sulfone dianhydride, and mixtures thereof. Other useful aromatic dianhydrides comprise: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 2,2-bis([4-

(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 2-[4-(3,4-dicarboxyphenoxy)phenyl]-2-[4-(2,3-dicarboxyphenoxy)phenyl]propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 1,4,5,8-naphthalenetetracarboxylic acid dianhydride; 3,4,3',4'-benzophenonetetracarboxylic acid dianhydride; 2,3,3',4'-benzophenonetetracarboxylic acid dianhydride; 3,4,3',4'-oxydiphthalic anhydride; 2,3,3',4'-oxydiphthalic anhydride; 3,3',4,4'-biphenyltetracarboxylic acid dianhydride; 2,3,3',4'-biphenyltetracarboxylic acid dianhydride; 2,3,2',3'-biphenyltetracarboxylic acid dianhydride; pyromellitic dianhydride; 3,4,3',4'-diphenylsulfonetetracarboxylic acid dianhydride; 2,3,3',4'-diphenylsulfonetetracarboxylic acid dianhydride; 1,4-bis(3,4-dicarboxyphenoxy)benzene dianhydride; and 2,2-bis(3,4-dicarboxyphenyl)hexafluoropropane dianhydride. Polyetherimide sulfones with structural units derived from mixtures comprising two or more dianhydrides are also contemplated.

In another embodiment, the dianhydride, as defined above, reacts with an aryl diamine that has a sulfone linkage. In one embodiment the polyetherimide sulfone includes structural units that are derived from an aryl diamino sulfone of the Formula IX:

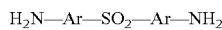

wherein Ar can be an aryl group species containing a single or multiple rings. Several aryl rings may be linked together, for example through ether linkages, sulfone linkages or more than one sulfone linkages. The aryl rings may also be fused.

In alternative embodiments, the amine groups of the aryl diamino sulfone can be meta or para to the sulfone linkage, for example, as in Formula X:

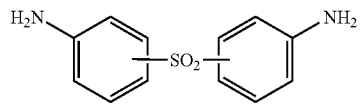

Aromatic diamines include, but are not limited to, for example, diamino diphenyl sulfone (DDS) and bis(aminophenoxy phenyl) sulfones (BAPS). The oxy diphthalic anhydrides described above may be used to form polyimide linkages by reaction with an aryl diamino sulfone to produce polyetherimide sulfones.

In some embodiments the polyetherimide sulfone resins can be prepared from reaction of an aromatic dianhydride monomer (or aromatic bis(ether anhydride) monomer) with an organic diamine monomer wherein the two monomers are present in essentially equimolar amounts, or wherein one monomer is present in the reaction mixture at no more than about 20% molar excess, and preferably less than about 10% molar excess in relation to the other monomer, or wherein one monomer is present in the reaction mixture at no more than about 5% molar excess. In other instances the monomers will be present in amounts differing by less than 1% molar excess.

Primary monoamines may be used to end-cap or chain-stop the polymer components, for example, to control molecular weight. In particular embodiments, primary monoamines comprise aromatic primary monoamines, illustrative examples of which comprise aniline, chloroaniline, perfluoromethyl aniline, naphthyl amines and the like. Aromatic primary monoamines may have additional functionality bound to the aromatic ring: such as, but not limited to, aryl groups, alkyl groups, aryl-alkyl groups, sulfone groups, ester groups, amide groups, halogens, halogenated alkyl or aryl groups, alkyl ether groups, aryl ether groups, or aryl keto groups. The attached functionality should not impede the function of the aromatic primary monoamine to control molecular weight. Suitable monoamine compounds are listed in U.S. Pat. No. 6,919,422.

Aromatic dicarboxylic acid anhydrides, that is, aromatic groups comprising one cyclic anhydride group, may also be used to control molecular weight in the polymer components. Illustrative examples comprise phthalic anhydride, substituted phthalic anhydrides, such as chlorophthalic anhydride, and the like. Said anhydrides may have additional functionality bound to the aromatic ring, illustrative examples of which comprise those functionalities described above for aromatic primary monoamines.

The polymer components may have a melt index of about 0.1 to about 10 grams per minute (g/min), as measured by American Society for Testing Materials (ASTM) D1238 at 340-425° C. In a one embodiment, the polymer components have an average molecular weight (Mw) of about 10,000 to about 150,000 grams per mole (g/mole), as measured by gel permeation chromatography, using a polystyrene standard. In another embodiment the polymer components have Mw of 20,000 to 60,000 g/mole.

In some instances, especially where the formation of the film and fiber are desired, the composition should be essentially free of fibrous reinforcement such as glass, carbon, ceramic or metal fibers. Essentially free of fibrous reinforcements means that in some instances the composition has less than 5 wt. % of fibrous reinforcement and in other embodiments the composition should have less than 1 wt. % fibrous reinforcement present.

In other instances it is useful to have compositions that develop some degree of crystallinity on cooling. This may be more important in articles with high surface area such as fibers and films which will cool of quickly due to their high surface area and may not develop the full crystallinity necessary to get optimal properties. In some instances the formation of crystallinity is reflected in the crystallization temperature (Tc), which can be measured by methods such as differential scanning calorimetry (DSC), for example, ASTM method D3418. The temperature of the maximum rate of crystallization may be measured as the Tc. In some instances, for example at a cooling rate of 80° C./min., it may be desirable to have a Tc of greater than or equal to about 240° C. In other instances, for example a slower cooling rate of 20° C./min., a crystallization temperature of greater than or equal to about 280° C. may be desired.

The compositions of the present invention are preferably made into various articles of manufacture. Preferably, the articles are prepared with no haze prevention layer as previously taught was needed in U.S. Pat. No. 7,128,959. The article may further comprise a metalized surface, which may be disposed on a coating selected from the group consisting of organic coatings, inorganic coatings, composite coating, and combinations thereof. The article may further comprise mold release agents, fillers or combinations thereof. The article may be in the form of a fiber, film, sheet, molded object, or composite. The film or sheet may be extruded. The article may be a reflector.

In addition to the polymer components of the blend, the skilled artisan will appreciate the wide range of ingredients which can be added to polymers to improve one or more manufacturing or performance property.

In some cases a metal oxide may be added to the compositions of the present invention. In some instances the metal oxide may further improve flame resistance (FR) performance by decreasing heat release and increasing the time to peak heat release. Titanium dioxide is of note. Other metal oxides include zinc oxides, boron oxides, antimony oxides, iron oxides and transition metal oxides. Metal oxides that are white may be desired in some instances. Metal oxides may be used alone or in combination with other metal oxides. Metal oxides may be used in any effective amount, in some instances at from 0.01 to 20 wt % of the polymer blend.

Other useful additives include smoke suppressants such as metal borate salts for example zinc borate, alkali metal or alkaline earth metal borate or other borate salts. Additionally other of boron containing compounds, such as boric acid, borate esters, boron oxides or other oxygen compounds of boron may be useful. Additionally other flame retardant additives, such as aryl phosphates and brominated aromatic compounds, including polymers containing linkages made from brominated aryl compounds, may be employed. Examples of halogenated aromatic compounds are brominated phenoxy resins, halogenated polystyrenes, halogenated imides, brominated polycarbonates, brominated epoxy resins and mixtures thereof.

Conventional flame retardant additives, for example, phosphate esters, sulfonate salts and halogenated aromatic compounds may also be employed. Mixtures of any or all of these flame retardants may also be used. Examples of halogenated aromatic compounds are brominated phenoxy resins, halogenated polystyrenes, halogenated imides, brominated polycarbonates, brominated epoxy resins and mixtures thereof. Examples of sulfonate salts are potassium perfluoro butyl sulfonate, sodium tosylate, sodium benzene sulfonate, sodium dichloro benzene sulfonate, potassium diphenyl sulfone sulfonate and sodium methane sulfonate. In some instances sulfonate salts of alkaline and alkaline earth metals are preferred. Examples of phosphate flame retardants are tri aryl phosphates, tri cresyl phosphate, triphenyl phosphate, bisphenol A phenyl diphosphates, resorcinol phenyl diphosphates, phenyl-bis-(3,5,5'-trimethylhexyl phosphate), ethyl diphenyl phosphate, bis(2-ethylhexyl)-p-tolyl phosphate, bis (2-ethylhexyl)-phenyl phosphate, tri(nonylphenyl)phosphate, phenyl methyl hydrogen phosphate, di(dodecyl)-p-tolyl phosphate, halogenated triphenyl phosphates, dibutyl phenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, resorcinol diphosphate and the like.

In some instances it may be desired to have flame retardant compositions that are essentially free of halogen atoms, especially bromine and chlorine. Essentially free of halogen atoms means that in some embodiments the composition has less than about 3% halogen by weight of the composition and in other embodiments less than about 1% by weight of the composition containing halogen atoms. The amount of halogen atoms can be determined by ordinary chemical analysis.

The composition may also optionally include a fluoropolymer in an amount of 0.01 to about 5.0% fluoropolymer by weight of the composition. The fluoro polymer may be used in any effective amount to provide anti-drip properties to the resin composition. Some possible examples of suitable fluoropolymers and methods for making such fluoropolymers are set forth, for example, in U.S. Pat. Nos. 3,671,487, 3,723,373 and 3,383,092. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Some of the suitable fluorinated alpha-olefin monomers include, for example, fluoro ethylenes such as, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

The compositions may further contain fillers and reinforcements for example fiber glass, milled glass, glass beads, flake and the like. Minerals such as talc, wollastonite, mica, kaolin or montmorillonite clay, silica, quartz and barite may be added. The compositions can also be modified with effective amounts of inorganic fillers, such as, for example, carbon fibers and nanotubes, metal fibers, metal powders, conductive carbon, and other additives including nano-scale reinforcements.

Other additives include antioxidants such as phosphites, phosphonites and hindered phenols. Phosphorus containing stabilizers including triaryl phosphite and aryl phosphonates are of note as useful additives. Difunctional phosphorus containing compounds can also be employed. Stabilizers with a molecular weight of greater than or equal to about 300 are preferred. In other instances phosphorus containing stabilizers with a molecular weight of greater than or equal to 500 are useful. Phosphorus containing stabilizers are typically present in the composition at 0.05-0.5% by weight of the formulation. Colorants as well as light stabilizers and UV absorbers may also be present in the blend. Flow aids and mold release compounds are also contemplated. Examples of mold release agents are alkyl carboxylic acid esters, for example, penta erythritol tetrastearate, glycerin tristearate and ethylene glycol distearate. Mold release agents are typically present in the composition at 0.05-0.5% by weight of the formulation. Preferred mold release agents will have high molecular weight, typically greater than about 300, to prevent loss of the release agent from the molten polymer mixture during melt processing.

The polymer components used in articles according to the present invention may also include various additives such as nucleating, clarifying, stiffness and/or crystallization rate agents. These agents are used in a conventional matter and in conventional amounts.

The polymer components used in articles according to the present invention can be blended with the aforementioned ingredients by a variety of methods involving intimate admixing of the materials with any additional additives desired in the formulation. A preferred procedure includes melt blending, although solution blending is also possible. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 250° C. and about 370° C. in the molten resin composition, although higher temperatures can be used provided that the residence time of the resin in the processing equipment is kept short. In some embodiments the melt processed composition exits processing equipment such as an extruder through small exit holes in a die, and the resulting strands of molten resin are cooled by passing the strands through a water bath. The cooled strands can be chopped and/or molded into any convenient shape, i.e. pellets, for packaging, further handling or ease of end use production.

The compositions discussed herein can be prepared by a variety of melt blending techniques. Use of a vacuum vented single or twin screw extruder with a good mixing screw is preferred. In general, the melt processing temperature at which such an extruder should be run is about 100° to about 150° C. higher than the Tg of the thermoplastic. The mixture of ingredients may all be fed together at the throat of the extruder using individual feeders or as a mixture. It may be advantageous first extrude a portion of the ingredients in a first extrusion and then add the remainder of the mixture in a second extrusion. It may be useful to first precompound the colorants into a concentrate which is subsequently mixed with the remainder of the composition. In other situations it may be beneficial to add portions of the mixture further down stream from the extruder throat. After extrusion the polymer melt can be stranded and cooled prior to chopping or dicing into pellets of appropriate size for the next manufacturing step. Preferred pellets are about 1/16 to 1/8 inch long, but the skilled artisan will appreciate that any pellet size will do. The pelletized compositions are then dried to remove water and molded into the articles of the invention. Drying at about 135° to about 150° C. for about 4 to about 8 hours is preferred, but drying times will vary with resin type. Injection molding is preferred using suitable temperature, pressures, and clamping to produce articles with a glossy surface. Melt temperatures for molding will be about 100° to about 200° C. above the $T_g$ of the composition. Oil heated molds are preferred for higher Tg resins. Mold temperatures can range from about 50° to about 175° C. with temperatures of about 120° to about 175° C. preferred. The skilled artisan will appreciate the many variations of these compounding and molding conditions which can be employed to make the compositions and articles of the invention.

The high flexural modulus and high tensile elongation of the compositions used in the articles of the present invention make them useful for applications, such as sheets, where they show resistance to damage by impact and also show sufficient stiffness so that they will not flex or bend under load. The combination of toughness, shown in high elongation at break, stiffness, as shown in a high flexural modulus and flame resistance, as shown in a low heat release values, make sheets or other articles formed from these compositions very useful For example, such sheets can be used for the construction of vehicles for transportation, for instance, cars, aircraft or train interiors. They can also be used in building and construction. Sheets can be prepared, for example, by extrusion, compression molding or calendering and can be thermoformed or shaped by other methods. Films and sheets can also be components in more complex multilayer constructions. Good impact is shown, in some instances by having a tensile elongation at break, for example, as measured by ASTM method D638, of greater than or equal to about 50%. High stiffness is shown in other instances by having a flexural modulus, for examples as measured by ASTM method D790, of greater than or equal to about 300 Kpsi (2070 Mpa).

Compositions of the invention may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendering. Co-extrusion and lamination processes may be employed to form composite multi-layer films or sheets.

Film and sheet of the invention may alternatively be prepared by casting a solution or suspension of the composition in a suitable solvent onto a substrate, belt or roll followed by removal of the solvent.

Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions of the invention may be converted to multi-wall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

Providing a single or multi-layer thermoplastic substrate having optionally one or more colors on the surface, for instance, using screen printing or a transfer dye Conforming the substrate to a mold configuration such as by forming and trimming a substrate into a three dimensional shape and fitting the substrate into a mold having a surface which matches the three dimensional shape of the substrate.

Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment of the invention relates to articles, sheets and films prepared from the compositions above.

All patents, patent applications and other publications disclosed herein are incorporated by reference in their entirety as though set forth in full.

EXAMPLES

Without further elaboration, it is believed that the skilled artisan can, using the description herein, make and use the present invention. The following examples are included to provide additional guidance to those skilled in the art of practicing the claimed invention. These examples are provided as representative of the work and contribute to the teaching of the present invention. Accordingly, these examples are not intended to limit the scope of the present invention in any way. Unless otherwise specified below, all parts are by weight.

Materials

TABLE 1

|  | DESCRIPTION | SOURCE |
|---|---|---|
| PEI | Polyetherimide | SABIC Innovative Plastics ULTEM ™ 1010K Resin |
| PEIS | Polyetherimide sulfone | SABIC Innovative Plastics ULTEM ™ XH6050 Resin |
| PES | Poly(ether sulfone) | BASF ULTRASON ™ Resin |

Techniques/Procedures

The ingredients of the examples shown in Table 1, were tumble blended at different ratios (see Table 2) and then extruded on a 1¾ inch 40:1 sterling Single Screw Extruder with equipped with a 40 μm (absolute) melt filter and a vacuum vent, at a barrel and die head temperature between 340-360° C. and 100-120 rpm screw speed. The extrudate was cooled through a water bath prior to pelletizing. Test parts were injection molded on a Newbury molding machine, 6-oz. Barrel, with a flat temperature profile and cycle time ranging from 35 to 37 seconds. The pellets were dried for 6 h at 300° F. in a convection oven prior to injection molding.

Methods

Differential scanning microscopy (DSC): All DSC analyses were preformed on a Perkin-Elmer DSC7. Samples were heated to 350° C. at 20° C./min (1st heating), cooled to 25° C. at 80° C./min, and heated to 350° C. at 20° C./min (2nd heating) and Tg values obtained from the 2nd heating were reported.

Dynamic mechanical analysis (DMA): All DMA analyses were performed on a TA Instruments 2980 at 3° C./min ramp rate and a frequency of 1 Hz in a flex mode.

Mechanical analysis: Tensile properties were tested on "dog bone" injection molded bars at room temperature with a crosshead speed of 5 mm/min using ASTM method D 638. Flex properties were tested on 80 mm*10 mm*3.2 mm (length*width*thickness) injection molded bars at room temperature with a crosshead speed of 1.3 mm/min. using ASTM method D 790.

Vicat: Vicat properties were measured on 40 mm*10 mm*3.2 mm (length*width*thickness) injection molded parts following ASTM method D1525 using a heating rate of 120° C./hr with a load of 50N.

Optical Analysis: The optical measurements such as % transmission, haze and yellowing index (YI) were run on Haze-guard dual from BYK-Gardner via test ASTM D1003.

Rheology: MVR measurements were conducted at 337° C., using 6.7 kg load with a dwell time of 6 min following ASTM method 1133.

Impact: Izod measurements were conducted on 40 mm*10 mm*3.2 mm (length*width*thickness) injection molded parts and were conducted following ASTM D256 at 23° C. using a pendulum of 2-5 ft-lbf.

Haze onset temperature: Dynatup disks (0.125" thickness) were vacuum-metallized on one side (~80 nm thickness aluminum coating). After metallization, the disks were placed in bags and sealed immediately. Disks were conditioned at 25° C./50% RH for 5 and 10 days prior to haze onset test while some disks were kept unconditioned. To determine haze onset temperatures, three metallized disks were placed in a calibrated air convection oven for 1.5 hrs. If no haze was observed, the oven temperature was increased by 2° C. and the disks were replaced with three fresh disks to avoid artifacts of in-situ annealing. Oven temperatures at which metallized disks hazed were recorded as haze onset temperatures.

Examples 1-4

Results/Discussion

Table 2

Pellets of PEI and PEIS were compounded and parts were injection molded and tested in accordance to the procedure described above. Table 1, above, shows the ingredients used in the blends discussed in the comparative examples and the examples of the invention are shown in Table 2.

TABLE 2

|  | PES Control A | PEI Control B | Composition 1 Example 1 | Composition 2 Example 2 | Composition 3 Example 3 | Composition 4 Example 4 |
|---|---|---|---|---|---|---|
| PES | 100 |  |  |  |  |  |
| PEI |  | 100 | 90 | 80 | 70 | 60 |
| PEIS |  |  | 10 | 20 | 30 | 40 |
| Haze onset temp (° C.); Cond 5 d AFTER metallization* | 204 | 202 | — | 204 | — | 210 |
| Haze onset temp (° C.); Cond 10 d AFTER metallization* | 200 | 202 | 202 | 204 | 206 | 208 |
| T. Mod. (MPa) | 3140 | 3830 | 3760 | 3670 | 3760 | 3640 |
| T. Str. (MPa) | 86 | 108 | 108 | 107 | 106 | 105 |
| Specific Gravity | 1.369 | 1.275 | 1.297 | 1.285 | 1.285 | 1.288 |
| Water Absorption, 24 h | 0.63 | 0.23 | 0.24 | 0.23 | 0.26 | 0.27 |

*Metallized parts were conditioned at 25° C. and 50% relative humidity

In the automotive lighting industry, it has become a commonly accepted practice to metallize molded reflector parts immediately, usually within 2 hrs. To be consistent with this metallization practice, molded parts were immediately sealed in airtight bags and shipped for metallization (on one side only). Metallized parts were then conditioned at 25° C. and 50% RH for 5 and 10 d, emulating real-life application conditions in which metallized reflectors at customers are often shelved in a warehouse for an extended period of time before being assembled. Although the aluminum surface coating served as an excellent barrier to prevent moisture absorption, moisture uptake was not prevented from the unmetallized side. The greater the moisture uptake is for any given material, the more likely for metallized parts to haze or form blisters at lower temperatures as the absorbed water attempts to escape at elevated temperatures. Table 2 shows improved haze onset temperatures observed for Examples 3 and 4 over the two control samples and Examples 1 and 2. Example 4 showed an 8° C. higher haze onset temperature relative to PES, Control A, after 10 d of conditioning. This phenomenon can be attributed to a combination of the higher heat capability of Example 4 and PES absorbing more moisture compared to Example 4.

In addition, as seen in Table 2 Examples 3 and 4 showed superior tensile strength and modulus compared to PES. Due to the lower specific gravities, 6-7% less materials was expected to be sourced using Examples 3 and 4. Furthermore, an application made with Example 3 and 4 are 6-7% lighter, consequently reducing parts weight and improving fuel economy in the end use.

Results/Discussion

Table 3

The compositions of Table 2 were further tested for rheological properties.

higher heat capabilities. Both Examples at 380° C. exhibit lower shear viscosities compared to PES (360° C.), indicating that process temperature can be fine-tuned to give an equivalent or better processability of the two examples. In addition, the spiral flow plots in FIG. 1 supports the high shear rheology results by showing a ~20° C. increase in processing temperature is sufficient in order to obtain equivalent or longer spiral flow lengths at all wall-thicknesses for Examples 2 and 4 with respect to PES.

While the invention has been described with reference to preferred embodiment, it will be understood by those skilled in the art that various changes may be made, and equivalents substituted, for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the present invention, but that the invention will include all embodiments falling within the scope of the appended claims.

We claim:
1. A composition comprising a transparent, miscible polymer blend consisting of:
(a) from about 30 to about 70 weight percent, based on the total weight of the polymer blend, of a polyetherimide sulfone comprising greater than or equal to 50 mole percent of the polymer linkages have an aryl sulfone group wherein the polyetherimide sulfone is made by reacting a salt of 4,4'-dihydroxy-2,2-diphenylpropane with a substituted aromatic bis(etherimide) compound of the Formula III:

TABLE 3

| Shear Rate 1/s | PES Control A Shear Viscosity Pa-s | PEI Control B Shear Viscosity Pa-s | Composition 1 Example 1 Shear Viscosity Pa-s | Composition 2 Example 2 Shear Viscosity Pa-s | Composition 3 Example 3 Shear Viscosity Pa-s | Composition 4 Example 4 Shear Viscosity Pa-s |
|---|---|---|---|---|---|---|
| 24.9 | 1328.5 | 1241.7 | 645 | 685.9 | 779.1 | 781.5 |
| 50.1 | 980.5 | 1144.6 | 600.3 | 614.8 | 701.4 | 728.2 |
| 100.2 | 913.6 | 1056.1 | 544.5 | 590.3 | 625.8 | 684.1 |
| 200.9 | 819.8 | 926.5 | 493.6 | 549.7 | 550.5 | 611.2 |
| 300.6 | 747.7 | 846.2 | 460.2 | 508.9 | 506.2 | 569.9 |
| 501.3 | 644.5 | 730.7 | 396.8 | 455.3 | 430.8 | 492.5 |
| 640.5 | 593.8 | 668.5 | 365.6 | 427.4 | 395.9 | 456.9 |
| 1002.4 | 494.3 | 553.7 | 311.5 | 370.7 | 334.8 | 398.1 |
| 1503.3 | 408.6 | 455.5 | 261.1 | 320.6 | 276.9 | 337.8 |
| 3007.1 | 275.7 | 306.7 | 176.9 | 230.1 | 183 | 235.9 |
| 5010.9 | 191.6 | 211.1 | 119.9 | 164.6 | 123.4 | 167.8 |
| 7016.3 | 150.2 | 165.9 | 93 | 131.8 | 95.8 | 135.2 |
| Temp (° C.) | 360 | 360 | 380 | 380 | 380 | 380 |

Table 3 shows the high shear rheology data for all four samples. Examples 3 and 4 are recommended to be processed at 20° C. higher temperature than PES and PEI due to their

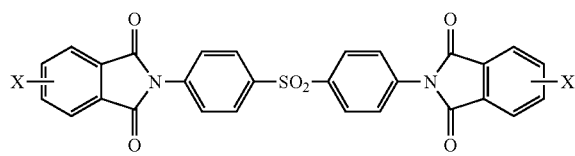

wherein X is halogen or nitro group;
and (b) from about 70 to about 30 weight percent, based on the total weight of the polymer blend, of a polyetherimide comprising more than 1 structural units derived from a dianhydride and a diamine wherein the dianhydride is selected from the group consisting of 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 2,2-bis[4-(2,3-dicarboxyphenoxy)phenyl] propane dianhydride; 4,4'-bis(2,3-dicarboxyphenoxy) diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy) diphenyl ether dianhydride; 4-(2,3-dicarboxyphenoxy)-4'-(3,4-dicarboxyphenoxy)diphenyl sulfide dianhydride; and, 4-(2,3-dicarboxyphenoxy)-4'-(3,4-dicarboxyphenoxy)benzophenone dianhydride; and mixtures thereof and the diamine is selected from the group consisting of ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl) propane, 2,4-bis(amino-t-butyl) toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl) sulfide, bis(4-aminophenyl) ether and combinations comprising two or more of the foregoing;

wherein the composition has a minimum haze onset temperature of about 205° C., and wherein the polyetherimide comprises less than 5 weight percent of impurities based on the weight of the polyetherimide, said impurities having a molecular weight of less than about 500 daltons and comprising structural units derived from at least one aromatic dianhydride monomer or aromatic bis(ether anhydride) monomer, or from at least one aromatic monoamine.

2. The composition of claim 1, wherein the diamine is p-phenylene or m-phenylene or a mixture thereof and the dianhydride is a bisphenol A dianhydride.

3. The composition of claim 1, wherein the polyetherimide comprises structural units of the Formula V:

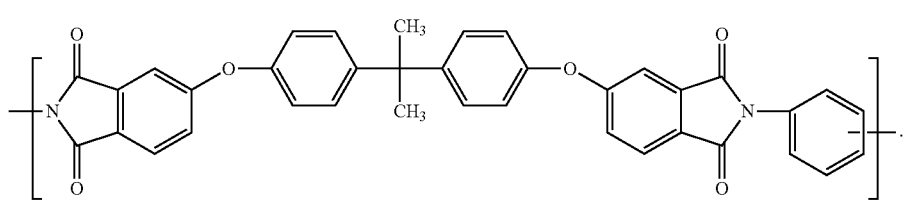

4. The composition of claim 1, wherein the polyetherimide comprises structural units of the Formula

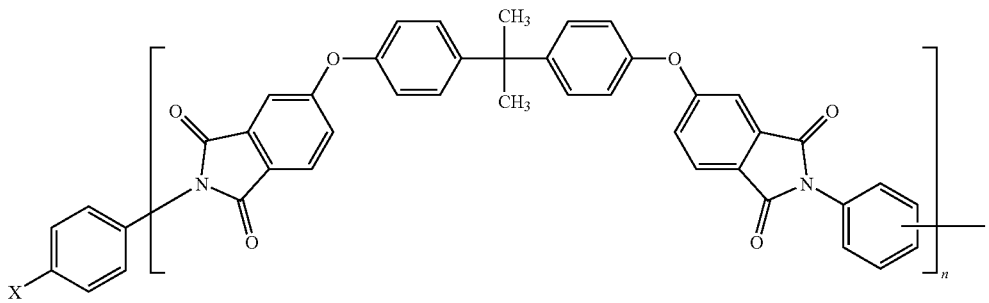

wherein X is hydrogen or an alkyl substituent, and n is more than 1.

5. An article comprising the composition of claim 1.
6. The article of claim 5, wherein the article has no haze prevention layer.
7. The article of claim 5, wherein the article further comprises a metalized surface.
8. The article of claim 7, wherein the metalized surface is disposed on a coating selected from the group consisting of organic coatings, inorganic coatings, composite coatings, and combinations thereof.
9. The article of claim 5, wherein the article is a reflector.
10. The article of claim 5, wherein the composition of the article further comprises a member selected from the group consisting of mold release agents, fillers, and combinations thereof.
11. The article of claim 5, comprising a film, sheet, molded object, or composite.
12. The article of claim 11, wherein the film, sheet, molded object, or composite has at least one layer comprising the composition.
13. The article of claim 5, wherein the article is an extruded film or an extruded sheet.

reacting a salt of 4,4'-dihydroxy-2,2-diphenylpropane with a substituted aromatic bis(etherimide) compound of the Formula III:

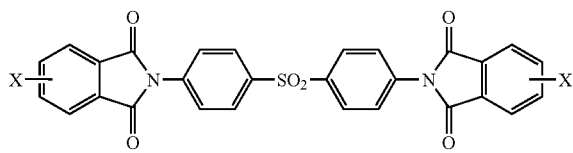

wherein X is halogen or nitro group;
and
(b) from about 60 to about 70 weight percent, based on the total weight of the polymer blend, of a polyetherimide comprising a polymer having the following formula:

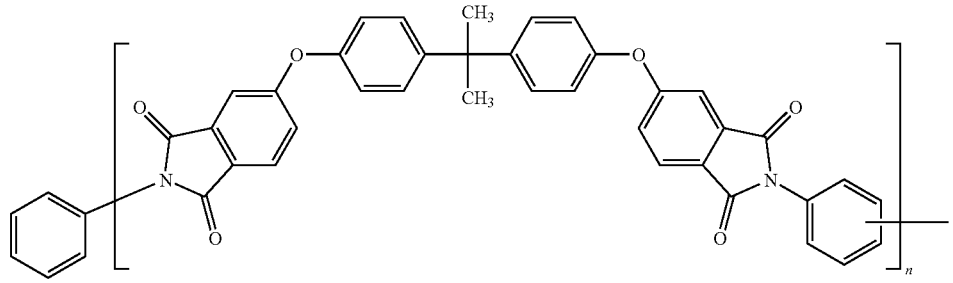

14. The article of claim 5, wherein the article is a fiber.
15. A composition comprising a transparent, miscible polymer blend consisting of:
(a) from about 30 to about 40 weight percent, based on the total weight of the polymer blend, of a polyetherimide sulfone comprising greater than or equal to 50 mole percent of the polymer linkages have an aryl sulfone group wherein the polyetherimide sulfone is made by wherein the composition has a minimum haze onset temperature of about 205° C., wherein the polyetherimide comprises less than 5 weight percent of impurities based on the weight of the polyetherimide, said impurities having a molecular weight of less than about 500 daltons and comprising structural units derived from at least one aromatic dianhydride monomer or aromatic bis(ether anhydride) monomer, or from at least one aromatic monoamine.

* * * * *